June 4, 1940.  W. P. SCHMITTER  2,203,636
VARIABLE SPEED TRANSMISSION
Filed May 15, 1936  2 Sheets-Sheet 1

INVENTOR.
Walter P. Schmitter
BY
ATTORNEY.

INVENTOR.
Walter P. Schmitter
BY
ATTORNEY.

Patented June 4, 1940

2,203,636

UNITED STATES PATENT OFFICE 2,203,636

VARIABLE SPEED TRANSMISSION

Walter P. Schmitter, Milwaukee, Wis., assignor to The Falk Corporation, Milwaukee, Wis., a corporation of Wisconsin Application May 15, 1936, Serial No. 79,886

26 Claims. (Cl. 74—281)

This invention relates to variable speed transmissions of the type involving a set of inclined tapered planet rollers and a contact ring adjustable lengthwise thereof to regulate their planetary action.

A variable speed transmission of this type, which has proven commercially successful, is disclosed in the copending application of myself and Alfred G. Bade, Serial No. 52,095, filed November 29, 1935. In the transmission therein disclosed, the required contact pressures between the rollers and ring are maintained by means which function to keep those pressures substantially constant throughout the range of speed ratios between the driving and driven shafts. Since those pressures are a measure of the torque carrying capacity of a transmission of the character described, the torque carrying capacity of that particular transmission is substantially constant at all output speeds and consequently the horsepower capacity decreases as the output speed decreases.

One object of the present invention is to provide, in a transmission of the character mentioned, pressure inducing means which will function to automatically vary the contact pressures between the rollers and ring with changes in speed ratio between the driving and driven shafts.

Another object is to provide pressure inducing means which will function to increase the contact pressures between the rollers and ring as the output speed is decreased so that the horsepower capacity of the transmission may remain substantially constant at various output speeds.

Another object is to effect the required contact pressures between the rollers and ring by a new combination and arrangement of parts.

Another object is to provide improved means for equalizing the contact pressures between the ring and the rollers of a group within the ring.

Another object is to simplify and improve the construction and operation of transmissions of the character mentioned.

Other more specific objects and advantages will appear, expressed or implied, from the following description of two embodiments of the present invention.

Figure 1:
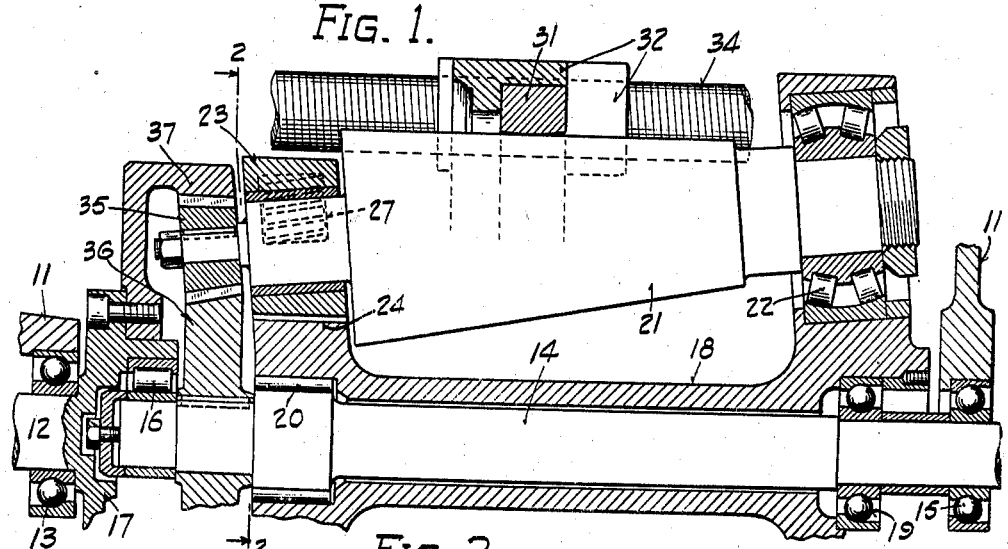
Fig. 1 is a fragmentary longitudinal sectional view of a portion of a variable speed transmission constructed in accordance with the present invention.

The variable speed transmission shown in Figs. 1 to 4 operates in a manner similar to that of the transmission described in the application identified above, and comprises a driven shaft 12 journalled in a bearing 13 in a frame or housing 11, portions only of which are shown. A drive shaft 14 aligned with the driven shaft 12 is journalled in a bearing 15 at the opposite end of the frame 11, and in a bearing 16 mounted in a head 17, fixed on the end of the driven shaft 12.

A rotor 18, freely rotatable around the drive shaft 14, is mounted thereon by bearings 19 and 20. Carried by the rotor 18 are a set of tapered rollers 21, in any convenient number, mounted in such position that their outer edges are substantially parallel to the axes of the shafts 12 and 14, and that their axes, if extended, would meet at a common apex on the extended axis of the shafts 12 and 14.

Each of the tapered rollers 21 is mounted at its smaller end in one end of the rotor 18, by means of a spherical or self-aligning bearing 22 of a well known type, which provides a fixed fulcrum for that end of the roller permitting angular displacement of the roller about the fixed center of the bearing.

Figure 2:
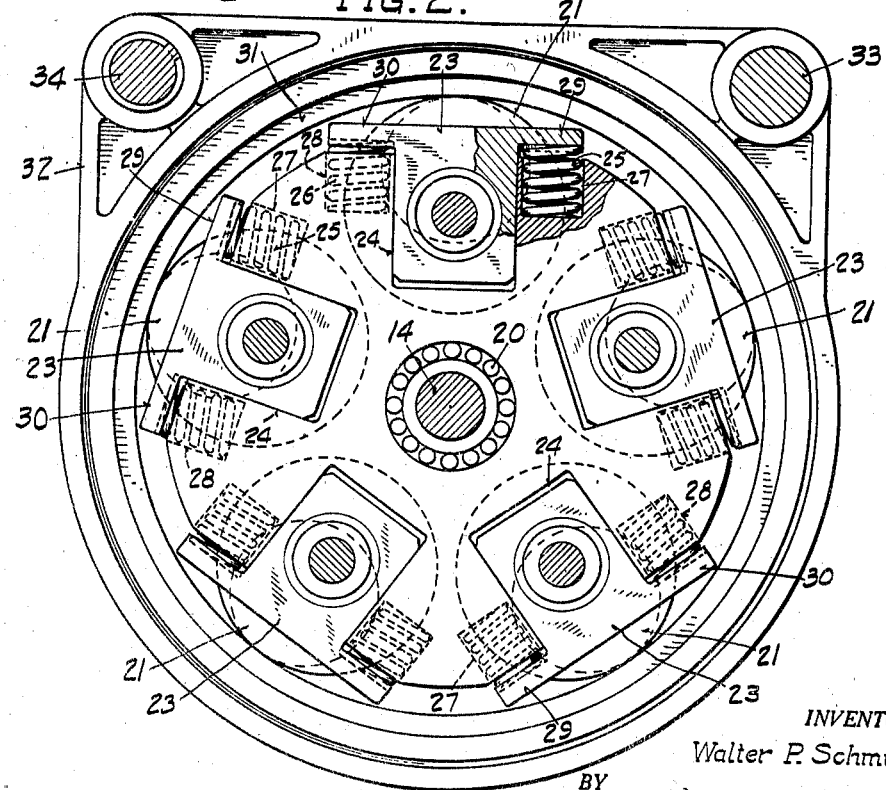
Fig. 2 is a transverse sectional view taken along the line 2—2 of Fig. 1.

In the form of the invention shown in Figs. 1 and 2, the opposite or large end of each of the rollers 21 is journalled in a slide block 23, guided in a radial slot 24 formed in the other end of the rotor 18. Coil springs 25 and 26, mounted in recesses 27 and 28 in the rotor 18 on either side of each slot 24, act against side flanges 29 and 30 on the block 23, so as to urge the large end of the roller outward or away from the shaft 14.

In all of the Figs. 1, 2, 3 and 4, the rollers 21 are shown encircled by a ring 31 against which the rollers are pressed with sufficient force to insure a gripping contact therewith. Although some pressure may be attained by the action of centrifugal force urging the rollers outwardly against the ring, it is desirable to provide pressure-inducing means, such as the springs 25 and 26 described above. The ring 31 is shown carried by a ring 32 mounted for axial movement upon and along a guide rod 33 and a parallel screw rod 34, both arranged parallel to the shaft 14 and lengthwise of the rollers 21. The arrangement is such that longitudinal movement of the rings 31 and 32 along the length of the rollers 21 is obtained by rotation of the screw rod 34, as is described in the application above identified.

Upon one end of each of the rollers 21 is fixed a pinion gear 35. These gears 35 together constitute a set of planet gears which engage with and revolve about a sun gear 36 fixed to the drive shaft 14. The planet gears 35 also are engaged with the internally toothed gear 37 fixed to the head 17 of the driven shaft 12. The internal gear 37, the pinion gears 35, and the sun gear 36 are preferably so formed as to provide excess clearance at the bases of their teeth, so as to permit slight outward movement of the rollers 21 and their pinions 35 without objectionable interference.

It will of course be understood that the sun gear 36 driven by shaft 14 imparts planetary movement to the several pinions 35 so that they rotate about their individual axes and simultaneously revolve about the shaft 14 within the internal gear 37, this planetary movement of the pinions 35 being controlled however by the planetary action of the rollers 21 with which they are connected, the planetary movement of the rollers 21 being controlled by their frictional contact with and rolling action against the ring 31. It will also be understood of course that this planetary movement of the rollers 21, and consequently of the pinions 35, is regulated by adjustment of the ring 31 along the tapered rollers 21, the internal gear 37 and consequently the shaft 12 being driven by the pinions 35 at maximum speed when the ring 31 contacts the rollers 21 at their large ends, and the speed of the shaft 12 being reduced as the ring 31 is moved toward the small ends of the rollers 21.

It will also be understood that the outward thrust of the springs 25 and 26 against the roller supporting blocks 23 is sustained solely by the encircling ring 31 and the reaction of the fulcrum bearing 22 at the smaller end of each roller 21, so that the resultant contact pressure between each roller and ring is at a minimum when the ring 31 is disposed at the larger ends of the rollers and remote from the fulcrum bearing 22, and that this contact pressure automatically increases as the ring 31 is shifted toward the smaller ends of the rollers and toward the fulcrum bearing 22.

The contact pressures between the rollers 21 and ring 31 thus vary automatically in accordance with positional changes of the ring along the rollers, the arrangement in the transmission shown being such that those pressures increase as the ring 31 is shifted toward the smaller ends of the rollers in a manner to decrease the speed of the driven shaft 12. The torque carrying capacity of the transmission thus increases as the speed of the driven shaft 12 decreases, a condition which renders the horsepower capacity of the transmission substantially constant at various output speeds.

Figure 3:
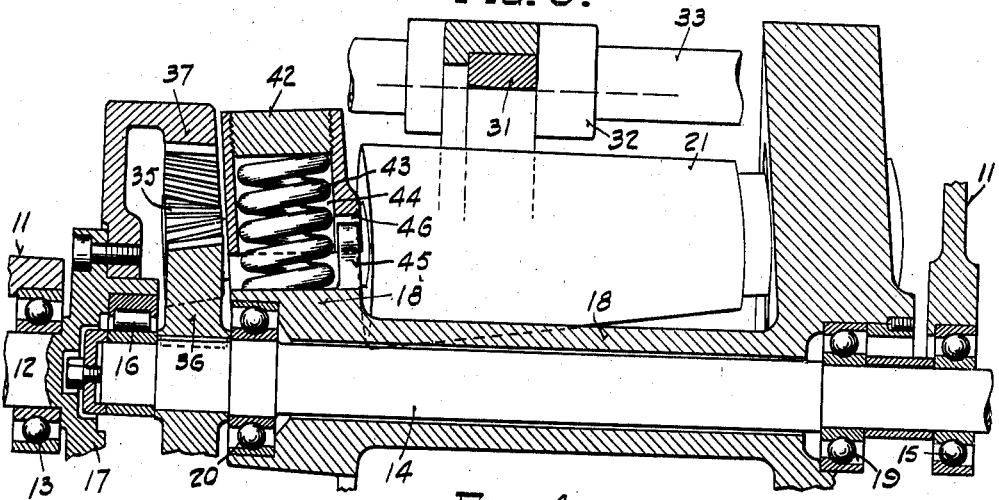
Fig. 3 is a fragmentary longitudinal sectional view of a portion of a variable speed transmission embodying the present invention in a different form.
Figure 4:
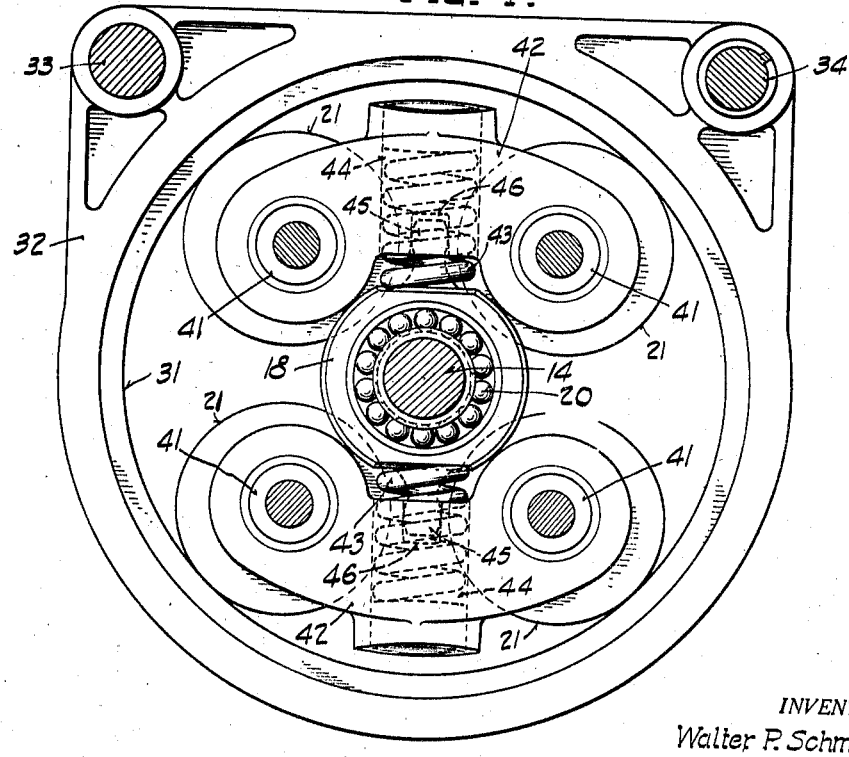
Fig. 4 is a transverse sectional view of the transmission shown in Fig. 3.

The transmission shown in Figs. 3 and 4 is similar in many respects to that shown in Figs. 1 and 2 except that, instead of a separate mounting for the large end of each roller 21, the rollers are grouped in pairs with the large ends of the rollers of each pair supported by appropriate bearings 41 provided in the opposite ends of a floating yoke 42.

In this instance each yoke is supported upon a radially disposed coil spring 43, seated upon the rotor 18 and confined within a bearing socket 44 formed in the yoke 42 midway of its ends. Each yoke 42 is also engaged with the rotor through a lug 45 which projects radially from the latter and is lockably engaged in a slot 46 formed in the yoke 42 midway of its ends. Each yoke 42 and its supported rollers are thus urged outwardly against the encircling ring 31 by their supporting spring 43 and each yoke is free to rock upon the lug 45, yet it is securely held by the lug 45 so as to revolve with the rotor 18.

It will be noted that the transmission, with this modified form of mounting for the rollers, operates in the same way and with the same advantages as the form shown in Figs. 1 and 2. In addition, however, the slight rocking movement of the yoke 42 upon the lug 45 permits the rollers of each pair to accommodate themselves to slight irregularities in the encircling ring 31, thus equalizing the pressure with which each of the rollers of a pair is held against the ring by the spring 43.

Various changes may be made in either of the embodiments of the invention hereinabove specifically described without departing from or sacrificing the advantages of the invention as defined in the appended claims.

I claim:

1. In a variable speed transmission, the combination of a plurality of longitudinally tapered centrifugally urged planetary rollers, supporting means therefor, a ring encircling and contacting said rollers and shiftable lengthwise thereof, and additional means for urging said rollers toward said ring to induce pressure contact therebetween, said additional means and said supporting means being relatively positioned to vary the contact pressures between rollers and ring in response to ring movement as said ring is shifted lengthwise of said rollers.

2. In a variable speed transmission the combination of a plurality of longitudinally tapered centrifugally urged planetary rollers, supporting means therefor, a ring encircling and contacting said rollers and shiftable lengthwise thereof, and additional pressure inducing means coacting with said supporting means to automatically increase the contact pressure between said rollers and ring in response to movement of said ring toward the small end of said rollers.

3. In a variable speed transmission the combination of rotary driving and driven members, torque transmitting means therebetween including a plurality of longitudinally tapered centrifugally urged planetary rollers, supporting means therefor, and a ring encircling and contacting said rollers and shiftable lengthwise thereof to regulate the speed of rotation of said driven member relative to said driving member, and pressure inducing means coacting with said supporting means and responsive to the position of said ring relative to said rollers for automatically increasing the contact pressures between said rollers and ring as the speed of said driven member decreases relative to the speed of the driving member.

4. In a variable speed transmission the combination of rotary driving and driven members, torque transmiting means therebetween including a plurality of longitudinally tapered planetary rollers, supporting means therefor, and a control element in rolling contact with said rollers and shiftable lengthwise of the latter to regulate the speed of rotation of said driven member relative to said driving member, and resilient pressure inducing means coacting with said supporting means to automatically vary the contact pressures between said roller and element in accordance with variations in speed of said driven member relative to said driving member.

5. In a variable speed transmission the combination of rotary driving and driven members, torque transmitting means therebetween including a plurality of longitudinally tapered centrifugally urged planetary rollers, supporting means therefor, and a control element in rolling contact with said rollers and shiftable lengthwise of the latter to regulate the speed of rotation of said driven member relative to said driving member, and additional pressure inducing means coacting with said supporting means to automatically vary the contact pressures between said rollers and element inversely as the speed of said driven member varies relative to the speed of said driving member.

6. In a variable speed transmission the combination of a rotor, a plurality of centrifugally urged longitudinally tapered planetary rollers each rockably supported at one end therein, torque transmitting gearing including a planet gear fixed to each of said rollers to rock therewith, a control ring encircling and contacting said rollers and shiftable longitudinally of said rollers, and mechanism incorporated in said transmission for urging the other ends of said rollers outwardly to effect pressure contact between said rollers and ring.

7. In a variable speed transmission the combination of a rotor, a plurality of longitudinally tapered planetary rollers each rockably supported at one end therein, a control ring encircling and contacting said rollers and shiftable longitudinally of said rollers, and resilient means for urging the other ends of said rollers outwardly to effect pressure contact between said rollers and ring.

8. In a variable speed transmission the combination of a rotor, a plurality of longitudinally tapered planetary rollers carried thereby, a bearing for one end of each of said rollers fixed in said rotor, a bearing for the other end of each of said rollers, carrier means for said last named bearings outwardly movable with respect to said rotor, and a ring encircling and contacting said rollers and shiftable longitudinally thereof.

9. In a variable speed transmission the combination of a rotor, a plurality of longitudinally tapered planetary rollers carried thereby, a bearing for one end of each of said rollers fixed in said rotor, a plurality of slide blocks mounted in and movable outwardly with respect to said rotor, a bearing in each of said slide blocks for receiving and supporting the other end of one of said rollers, and a control ring encircling and contacting said rollers and shiftable longitudinally thereof.

10. In a variable speed transmission the combination of a rotor, a plurality of longitudinally tapered planetary rollers longitudinally fixed therein, a ring encircling and contacting said rollers and shiftable longitudinally thereof, a plurality of slide blocks movably mounted on said rotor for supporting said rollers at one end, and resilient means coacting with said blocks to force said rollers against said ring.

11. In a variable speed transmission the combination of a rotor, a plurality of longitudinally tapered planetary rollers longitudinally fixed therein, a ring encircling and contacting said rollers and shiftable longitudinally thereof, means movably mounted at one end of said rotor for supporting said rollers at one end, and resilient means coacting with said last named means for forcing said rollers against said ring.

12. In a variable speed transmission the combination of a rotary carrier, a plurality of members moveable with and with respect to said carrier, a plurality of pairs of longitudinally tapered planetary rollers rotatable with and with respect to said carrier, each of said pairs of rollers being journalled in one of said members, and a control member frictionally engaged with said rollers and shiftable lengthwise thereof.

13. In a variable speed transmission the combination of a rotor, a plurality of pairs of longitudinally tapered planetary rollers carried thereby, a ring encircling and contacting said rollers and shiftable longitudinally thereof, a plurality of members rockably supported on said rotor, each of said pairs of rollers being carried by one of said members, and means coacting with said members and rotor for forcing said rollers against said ring.

14. In a variable speed transmission the combination of a rotor, a carrier member rockably supported intermediate its ends on said rotor, a pair of longitudinally tapered planetary rollers journalled in the opposite ends of said member, a ring encircling and contacting said rollers and shiftable longitudinally thereof, and resilient means coacting with said member and rotor for forcing said rollers against said ring.

15. In a variable speed transmission the combination of a rotor, a floating member rockably mounted on said rotor, a pair of longitudinally tapered planetary rollers journalled in said member, and a ring encircling and contacting said rollers and shiftable longitudinally thereof to regulate the speed ratio of the transmission.

16. In a variable speed transmission the combination of a rotor, a pair of longitudinally tapered planetary rollers each supported at one end in said rotor, a floating member carried by said rotor for supporting the other ends of said rollers, and a ring encircling and contacting said rollers and shiftable longitudinally thereof to regulate the speed ratio of the transmission.

17. In a variable speed transmission, the combination of a circular control element, a centrifugally urged longitudinally tapered rotary member inclined with respect to the axis of said element, a rotor in which said member is mounted to revolve about said axis in rolling engagement with said element, said rotary member and said control element being relatively moveable axially of said element to regulate the speed ratio of the transmission, torque transmitting gearing including a pinion fixed to said member, and additional means coacting with said member and said element to produce pressure between said member and said element variable inversely as the speed ratio of the transmission varies.

18. In a variable speed transmission, the combination of a circular control element, a centrifugally urged longitudinally tapered rotary member inclined with respect to the axis of said element and mounted to revolve about said axis in rolling engagement with said element, said rotary member and said control element being relatively moveable axially of said element to regulate the speed ratio of the transmission, supporting means for said member, and mechanical pressure inducing means coacting with said supporting means to induce contact pressure between said member and said element variable in response to relative axial movement between said member and said element.

19. In a variable speed transmission, the combination of a circular control element, a longitudinally tapered rotary member inclined with respect to the axis of said element, a rotor in which said member is mounted to revolve about said axis in rolling engagement with said element, said rotary member and said control element being relatively moveable axially of said element to regulate the speed ratio of the transmission, and spring actuated means coacting with said element to induce pressure between said member and said element variable in response to variations in driven speed of said transmission relative to the driving speed.

20. In a variable speed transmission, the combination of a circular control element, a pair of longitudinally tapered members inclined with respect to the axis of said element, a rotor in which said member is mounted to revolve about said axis in rolling engagement with said element, said members and said element being relatively moveable to regulate the speed ratio of the transmission, and a supporting piece carrying said members and moveable therewith about the axis of said element, said supporting piece being moveable toward said element to induce contact pressures between said members and said element and being rockably mounted to substantially equalize said contact pressures.

21. A variable speed transmission of the character described comprising a rotary carrier including spaced end plates and longitudinally extending members connecting said plates, a conical planetary roller having journals at its ends, a spherical bearing mounted on one of the end plates of the carrier and coacting with one of said journals to mount the roller for rotation with and with respect to the carrier and also for swinging movement, a slide having a bearing coacting with the other journal of the roller, the other of said end plates having a radially extending guide in which said slide is fitted, and a traction ring encircling the roller and adjustable lengthwise thereof to control its motion.

22. A variable speed transmission of the character described comprising a rotary carrier, a conical planetary roller having journals at its ends in fixed relation to the roller and its axis, bearing means mounted on the carrier and coacting with one of said journals to support the roller for rotation with and with respect to the carrier and also for swinging movement with respect to the carrier about a fixed point, a bearing coacting with the journal at the other end of the roller to support the roller for rotation with and with respect to the carrier, a slide for said bearing, said rotary carrier having a radially extending guideway in which said slide is slidably fitted, and a traction ring encircling said roller and adjustable lengthwise thereof to control its motion.

23. A variable speed transmission of the character described comprising a rotary carrier, a conical planetary roller having journals at its ends co-axial with and in fixed relation to the roller, bearings mounted on the carrier and co-acting with the journals to support the roller for rotation with and with respect to the carrier, one of said bearings having means associated therewith to provide for swinging movement of the roller axis about a fixed point, guide means interrelated with the other bearing and the carrier for constraining the roller to swinging movement in a plane which includes the axis of the carrier and said fixed point, and a traction ring encircling the roller and adjustable lengthwise thereof to control its motion.

24. A variable speed transmission of the character described comprising a rotary carrier, a conical planetary roller having journals adjacent the ends thereof and fixedly interrelated therewith, bearing means mounted on the carrier and co-acting with one of said journals to support the roller for rotation with and with respect to the carrier and also for swinging movement with respect thereto about a fixed point, bearing means co-acting with the journal at the other end of the roller to support the roller for rotation, said rotary carrier having a guideway slidably receiving said last named bearing means and constraining it to rotate with the carrier while providing for swinging movement thereof toward and away from the axis of rotation of the carrier, and a traction ring encircling said roller and adjustable lengthwise thereof to control its motion.

25. A variable speed transmission of the character described comprising a rotary carrier, a conical planetary roller having journals at its ends in fixed relation to the roller and its axis, bearings mounted on the carrier and co-acting with the journals to support the roller for rotation with and with respect to the carrier, one of said bearings having means associated therewith to provide for swinging movement of the roller about a fixed point, guide means interrelated with the other bearing and the carrier to provide for swinging movement of the roller about said fixed point and toward and away from the axis of rotation of the carrier, and a traction ring encircling the roller and adjustable lengthwise thereof to control its motion.

26. In a variable speed transmission the combination of a rotor, a plurality of longitudinally tapered planetary rollers each rockably supported at one end therein, a control ring encircling and contacting said rollers and shiftable longitudinally of said rollers, and resilient means coacting with the rotor for urging the other ends of said rollers outwardly to effect pressure contact between said rollers and ring.

WALTER P. SCHMITTER.